US012122981B2

(12) United States Patent
Barnabas et al.

(10) Patent No.: US 12,122,981 B2
(45) **Date of Patent: *Oct. 22, 2024**

(54) CLEANING COMPOSITION

(71) Applicant: The Procter & Gamble Company, Cincinnati, OH (US)

(72) Inventors: Freddy Arthur Barnabas, West Chester, OH (US); Gregory Thomas Waning, Fairfield, OH (US); Lori Ann Bacca, Waynesville, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/111,693

(22) Filed: Dec. 4, 2020

(65) Prior Publication Data

US 2021/0171866 A1 Jun. 10, 2021

Related U.S. Application Data

(60) Provisional application No. 62/944,099, filed on Dec. 5, 2019.

(51) Int. Cl.

| | |
|---|---|
| ***C11D 1/02*** | (2006.01) |
| ***C11D 1/14*** | (2006.01) |
| ***C11D 1/62*** | (2006.01) |
| ***C11D 1/72*** | (2006.01) |
| ***C11D 1/86*** | (2006.01) |

(Continued)

(52) U.S. Cl.

CPC .............. *C11D 3/2086* (2013.01); *C11D 1/14* (2013.01); *C11D 1/62* (2013.01); *C11D 1/72* (2013.01); *C11D 1/86* (2013.01); *C11D 3/2075* (2013.01); *C11D 3/2082* (2013.01); *C11D 3/30* (2013.01); *C11D 3/33* (2013.01); *C11D 3/50* (2013.01); *C11D 2111/18* (2024.01)

(58) Field of Classification Search

CPC .... C11D 1/14; C11D 1/62; C11D 1/72; C11D 3/2075; C11D 3/2082

USPC ................ 510/238, 421, 426, 477, 488, 504

See application file for complete search history.

(56) References Cited

U.S. PATENT DOCUMENTS 5,972,876 A * 10/1999 Robbins .................. C11D 1/94 134/40
6,255,269 B1 * 7/2001 Leonard ............... C11D 3/2086 510/508

(Continued)

FOREIGN PATENT DOCUMENTS

WO 2012177276 A1 12/2012
WO WO-2013056901 A1 * 4/2013 ........... C11D 3/2079

OTHER PUBLICATIONS

Barbosa et al., "Liquid-liquid equilibrium of aqueous two-phase systems formed by non-ionic surfactant (Triton X-165 or Triton X-305) and ionic liquid based on the choline cation (choline bitartrate or choline dihydrogen citrate)", Journal of Molecular Liquids, Elsevier, Amsterdam, NL, vol. 318, dated Aug. 12, 2020.

(Continued)

*Primary Examiner* — Gregory R Delcotto

(74) *Attorney, Agent, or Firm* — Carolyn S. Powell; Andres E. Velarde

(57) ABSTRACT

A cleaning composition is disclosed. The cleaning composition includes a hydroxy acid, a hydrogen bond acceptor, and a surfactant. The hydroxy acid and hydrogen bond acceptor are present at a molar ratio of from about 5:1 to about 1.5:1.

10 Claims, 5 Drawing Sheets

100 102 104 106 108 110 112

(51) Int. Cl.

| | |
|---|---|
| ***C11D 3/16*** | (2006.01) |
| ***C11D 3/20*** | (2006.01) |
| ***C11D 3/30*** | (2006.01) |
| ***C11D 3/33*** | (2006.01) |
| ***C11D 3/50*** | (2006.01) |

(56) References Cited

U.S. PATENT DOCUMENTS

| | | | | |
|---|---|---|---|---|
| 6,268,330 | B1 * | 7/2001 | Leonard | C11D 17/0021 510/432 |
| 6,489,285 | B2 * | 12/2002 | Faber | C11D 3/10 510/470 |
| 6,608,020 | B1 * | 8/2003 | Durbut | C11D 3/18 510/432 |
| 2007/0086971 | A1 * | 4/2007 | Diet | A61K 8/36 424/70.31 |
| 2010/0248486 | A1 | 9/2010 | Nakamura | |
| 2011/0308556 | A1 | 12/2011 | Smets et al. | |
| 2016/0160155 | A1 * | 6/2016 | Call | C11D 1/94 510/405 |
| 2018/0030389 | A1 * | 2/2018 | Garyali | A61K 8/361 |
| 2018/0127683 | A1 * | 5/2018 | Levitt | C11D 1/72 |

OTHER PUBLICATIONS

Database WPI, Week 201824 , Thomson Scientific., London, GB; , AN 2018-217663, XP002802278, & CN107789376 A (Univ Nanjingforestry), dated Mar. 13, 2018.

International Search Report and Written Opinion; Application Ser. No. PCT/US2020/063198; dated Mar. 16, 2021, 19 pages.

Sahin Selin Ed—Markewszeski Mark, "Tailor-designed deep eutectic liquids as a sustainable extraction media: An alternative to ionic liquids", Journal of Pharmaceutical and Biomedical Analysis, Elsevier B.V, Amsterdam. NL. vol. 174, dated May 27, 2019 (2019-85-27), pp. 324-329.

* cited by examiner

134

132

130

128

CLEANING COMPOSITION

FIELD OF THE INVENTION

The present invention is in the field of cleaning compositions.

BACKGROUND OF INVENTION

Tough food soil removal through quicker, more effortless means is a continuing goal in dishwashing. Most attention historically has been given to pure grease soils. Also, everyday cleaning needs are readily met by conventional cleaners and cleaning equipment. Removal of heavily encrusted and burnt on soils, however, remains a challenge. Common approaches include prolonged soaking and/or heavy scouring. Specialty solutions such as pre-treatment products can be generally effective but very abrasive or harsh (high pH) on hands and surfaces. Also, they are inconvenient to the consumer since multiple products are required for complete cleaning. An increasing problem comes from the greater use of microwave ovens that provide more intensive cooking. Hence, It would be desirable to have a cleaner that is effective on tough soil removal.

SUMMARY OF THE INVENTION

A cleaning composition is disclosed. The cleaning composition includes a hydroxy acid, a hydrogen bond acceptor, and a surfactant. The hydroxy acid and hydrogen bond acceptor are present at a molar ratio of from about 5:1 to about 1.5:1.

A cleaning composition is further disclosed. The cleaning composition includes a hydrogen bond donor, a choline chloride, and a surfactant. The hydrogen bond donor and choline chloride are present at a molar ratio of from about 5:1 to about 1.5:1.

BRIEF DESCRIPTION OF THE DRAWINGS

While the specification concludes with claims particularly pointing out and distinctly claiming the subject matter of the present invention, it is believed that the invention can be more readily understood from the following description taken in connection with the accompanying drawings, in which:

DETAILED DESCRIPTION OF THE INVENTION

Figure 1:
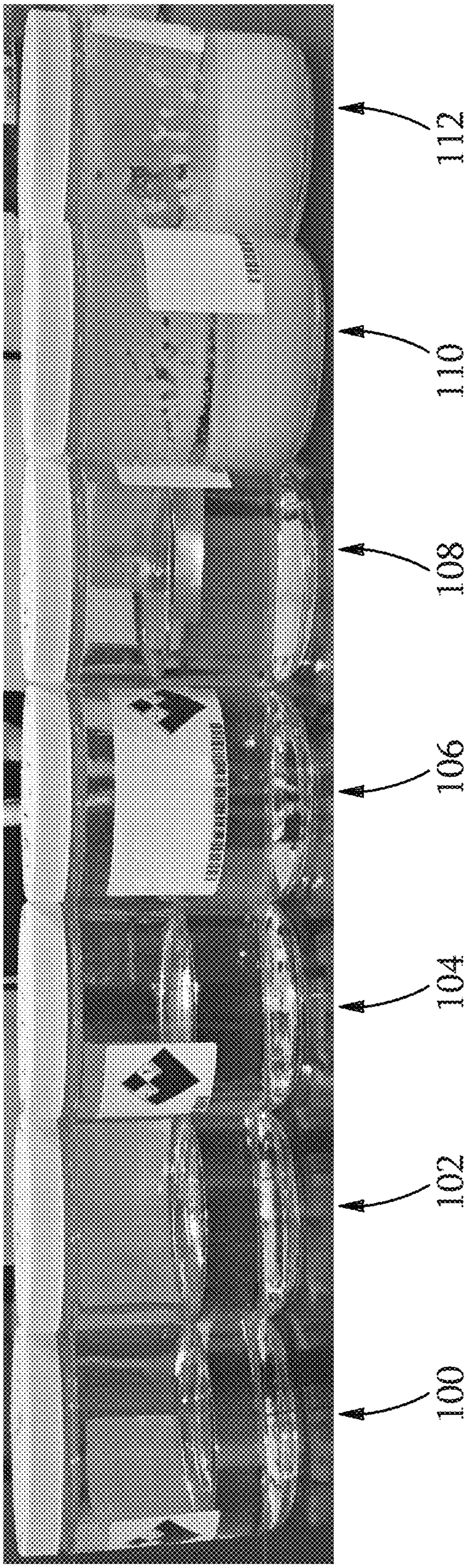
FIG. 1 is an image of multiple samples exemplifying an aspect of the invention.

The following description of the preferred embodiment(s) is merely exemplary in nature and is in no way intended to limit the invention, its application, or uses. The following description relates to a cleaning composition.

The composition includes a hydrogen bond acceptor in the form of either an amino acid or an quaternary ammonium salt. The amino acid may be selected from 1-arginine, 1-proline, 1-alanine, 1-phenylalanine, 1-glutamine, 1-lysine, β-alanine, glycine, betaine. The quaternary ammonium salt may be a choline salt to improve the cleaning efficiency of the composition.

The amount of choline chloride may be at least 7.5%, at least 10%, at least 15%, at least 20%, at least 25, at least 30%, at least 35%, at least 40%, at least 50%, at least 55%, at least 60%, at least 65%, at least 70%, at least 75% by weight, at least 80%, at least 85%, or at least 90% by weight. In certain embodiments, the amount of choline bicarbonate is at least 1%, at least 5%, at least 7.5%, at least 10%, at least 15%, at least 20%, at least 25, at least 30%, at least 35%, at least 40%, at least 50%, at least 55%, at least 60%, at least 65%, at least 70%, at least 75% by weight, at least 80%, at least 85%, or at least 90% by weight. In certain embodiments, the amount of choline salicylate and/or choline dihydrogencitrate is at least 0.5%, at least 1%, at least 5%, at least 7.5%, at least 10%, at least 15%, at least 20%, at least 25, at least 30%, at least 35%, at least 40%, at least 50%, at least 55%, at least 60%, at least 65%, at least 70%, at least 75% by weight, at least 80%, at least 85%, or at least 90% by weight.

The composition optionally contains a hydrogen bond donor for the choline salt. Examples of the hydrogen bond donor include, but are not limited to, urea, aromatic carboxylic acids or their salts, salicylic acid, salicylate, benzoic acid, benzoate, dicarboxylic acids or their salts, oxalic acid, malonic acid, succinic acid, glutaric acid, adipic acid, tartaric acid, tricarboxylic acids or their salts, citric acid or its salts.

The amount of hydrogen bond donor may be at least 1%, at least 5%, at least 10%, at least 15%, at least 20%, at least 25%, at least 30%, at least 35%, at least 40%, at least 50%, at least 55%, at least 60%, at least 65%, at least 70%, or at least 75% by weight.

The hydrogen bond donor can be present in a weight ratio with the choline salt in a ratio of hydrogen bond donor to choline salt of 1:1 to 4:1. In certain embodiments, the ratio is about 1:1. In other embodiments, the ratio is about 2:1 or about 3:1.

Choline chloride itself is not a liquid salt as its melting point is significantly above 100° C. (upper limit indicated by liquid salt definition). The combination of keto acids and hydroxy acids and simple mono and dicarboxylic acids in combination with quaternary ammonium salts, however, forms what is termed a "deep eutectic solvent" that displays liquid salt-like properties in terms of unusually low melting point. The optimum molar ratio of levulinic acid to choline chloride, in terms of lowest melting point depression, is about 5:1 to about 1.5:1, respectively. Surprisingly, it has been found in our research that this deep eutectic liquid also provides effective solubility and stability of components such as, for example, perfumes in solution to create a clear composition. Additionally, it has been surprisingly found that the disclosed ratios creates a solution that leaves a high gloss level on surfaces after cleaning.

The cleaning composition may include a quaternary ammonium salt compound. The quaternary ammonium salt has the formula:

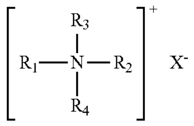

wherein $R_1$ is hydrogen or an aliphatic group having from 1 to 22 carbon atoms; $R_2$ is an aliphatic group having from 10 to 22 carbon atoms; $R_3$ and $R_4$ are each alkyl groups having from 1 to 3 carbon atoms; and X is an anion selected from the halogen, acetate, phosphate, nitrate and methyl-sulfate radicals.

Representative examples of quaternary ammonium salts which constitute component (i) of this invention include tallow trimethyl ammonium chloride; ditallow dimethyl ammonium chloride; ditallow dimethyl ammonium methyl sulfate; dihexadecyl dimethyl ammonium chloride; di(hydrogenated tallow) dimethyl ammonium chloride; dioctadecyl dimethyl ammonium chloride; dieicosyl dimethyl ammonium chloride; didocosyl dimethyl ammonium chloride; di(hydrogenated tallow) dimethyl ammonium methyl sulfate; dihexadecyl diethyl ammonium chloride; dihexadecyl dimethyl ammonium acetate; choline chloride; ditallow dipropyl ammonium phosphate; ditallow dimethyl ammonium nitrate; and di(coconut-alkyl) dimethyl ammonium chloride.

An especially preferred quaternary ammonium fabric conditioning agent is ditallow dimethyl ammonium chloride that is commercially available from General Mills, Inc. under the tradename ALIQUAT-2HT and from Ashland Oil, Inc. as ADOGEN 448.

Compositions of the present invention preferably comprise an organic hydroxy acid and/or a keto acid for providing benefits in regulating skin condition, especially in therapeutically regulating signs of skin aging, more especially wrinkles, fine lines, and pores. Suitable hydroxy acids include $C_1$-$C_{18}$ hydroxy acids, preferably $C_8$ or below. The hydroxy acids can be substituted or unsubstituted, straight chain, branched chain or cyclic (preferably straight chain), and saturated or unsaturated (mono- or poly-unsaturated) (preferably saturated). Non-limiting examples of suitable hydroxy acids include glycolic acid, lactic acid, salicylic acid, 5 octanoyl salicylic acid, hydroxyoctanoic acid, hydroxycaprylic acid, and lanolin fatty acids. A nonlimiting example of a keto acid is pyruvic acid. Preferred concentrations of the organic hydroxy and/or keto acid range from about 0.1% to about 10%, more preferably from about 0.2% to about 5%, also preferably from about 0.5% to about 2%. Lactic acid, salicylic acid, and pyruvic acid are preferred. The organic hydroxy acids enhance the skin appearance benefits of the present invention.

Compositions described herein may comprise carboxylic monomers. Carboxylic monomers useful in the production of the copolymers of this invention are the olefinically-unsaturated carboxylic acids containing at least one activated carbon-to-carbon olefinic double bond, and at least one carboxyl group, that is, an acid containing an olefinic double bond which readily functions in polymerization because of its presence in the monomer molecule either in the alpha-beta position with respect to a carboxyl group or as part of a terminal methylene grouping. The anhydrides can also be used, especially maleic anhydride.

Compositions of the present invention may also comprise an organic hydroxy acid. Nonlimiting examples of suitable hydroxy acids include salicylic acid, glycolic acid, lactic acid, 5 octanoyl salicylic acid, hydroxyoctanoic acid, hydroxycaprylic acid, and lanolin fatty acids. A preferred acid is levulinic acid.

The product may use a perfume delivery system. Certain perfume delivery systems, methods of making certain perfume delivery systems and the uses of such perfume delivery systems are disclosed in USPA 2007/0275866 A1. Such perfume delivery systems include: Polymer Assisted Delivery (PAD): This perfume delivery technology uses polymeric materials to deliver perfume materials. Classical coacervation, water soluble or partly soluble to insoluble charged or neutral polymers, liquid crystals, hot melts, hydrogels, perfumed plastics, microcapsules, nano- and micro-latexes, polymeric film formers, and polymeric absorbents, polymeric adsorbents, etc. are some examples. PAD includes but is not limited to: a.) Matrix Systems: The fragrance is dissolved or dispersed in a polymer matrix or particle. Perfumes, for example, may be 1) dispersed into the polymer prior to formulating into the product or 2) added separately from the polymer during or after formulation of the product. Diffusion of perfume from the polymer is a common trigger that allows or increases the rate of perfume release from a polymeric matrix system that is deposited or applied to the desired surface (situs), although many other triggers are know that may control perfume release. Absorption and/or adsorption into or onto polymeric particles, films, solutions, and the like are aspects of this technology. Nano- or micro-particles composed of organic materials (e.g., latexes) are examples. Suitable particles include a wide range of materials including, but not limited to polyacetal, polyacrylate, polyacrylic, polyacrylonitrile, polyamide, polyaryletherketone, polybutadiene, polybutylene, polybutylene terephthalate, polychloroprene, poly ethylene, polyethylene terephthalate, polycyclohexylene dimethylene terephthalate, polycarbonate, polychloroprene, polyhydroxyalkanoate, polyketone, polyester, polyethylene, polyetherimide, polyethersulfone, polyethylenechlorinates, polyimide, polyisoprene, polylactic acid, polymethylpentene, polyphenylene oxide, polyphenylene sulfide, polyphthalamide, polypropylene, polystyrene, polysulfone, polyvinyl acetate, polyvinyl chloride, as well as polymers or copolymers based on acrylonitrile-butadiene, cellulose acetate, ethylene-vinyl acetate, ethylene vinyl alcohol, styrene-butadiene, vinyl acetate-ethylene, and mixtures thereof.

"Standard" systems refer to those that are "pre-loaded" with the intent of keeping the pre-loaded perfume associated with the polymer until the moment or moments of perfume release. Such polymers may also suppress the neat product odor and provide a bloom and/or longevity benefit depending on the rate of perfume release. One challenge with such systems is to achieve the ideal balance between 1) in-product stability (keeping perfume inside carrier until you need it) and 2) timely release (during use or from dry situs). Achieving such stability is particularly important during in-product storage and product aging. This challenge is particularly apparent for aqueous-based, surfactant-containing products, such as heavy duty liquid laundry detergents. Many "Standard" matrix systems available effectively become "Equilibrium" systems when formulated into aqueous-based products. One may select an "Equilibrium" system or a Reservoir system, which has acceptable in-product diffusion stability and available triggers for release (e.g., friction). "Equilibrium" systems are those in which the perfume and polymer may be added separately to the product, and the equilibrium interaction between perfume and polymer leads to a benefit at one or more consumer touch points (versus a free perfume control that has no polymer-assisted delivery technology). The polymer may also be pre-loaded with perfume; however, part or all of the perfume may diffuse during in-product storage reaching an equilibrium that includes having desired perfume raw materials (PRMs) associated with the polymer. The polymer then carries the perfume to the surface, and release is typically via perfume diffusion. The use of such equilibrium system polymers has the potential to decrease the neat product odor intensity of the neat product (usually more so in the case of pre-loaded standard system). Deposition of such polymers may serve to "flatten" the release profile and provide increased longevity. As indicated above, such longevity would be achieved by suppressing the initial intensity and may enable the formulator to use more high impact or low odor detection threshold (ODT) or low Kovats Index (KI) PRMs to achieve FMOT benefits without initial intensity that is too strong or distorted. It is important that perfume release occurs within the time frame of the application to impact the desired consumer touch point or touch points. Suitable micro-particles and micro-latexes as well as methods of making same may be found in USPA 2005/0003980 A1. Matrix systems also include hot melt adhesives and perfume plastics. In addition, hydrophobically modified polysaccharides may be formulated into the perfumed product to increase perfume deposition and/or modify perfume release. All such matrix systems, including for example polysaccarides and nanolatexes may be combined with other PDTs, including other PAD systems such as PAD reservoir systems in the form of a perfume microcapsule (PMC). Polymer Assisted Delivery (PAD) matrix systems may include those described in the following references: US Patent Applications 2004/0110648 A1; 2004/0092414 A1; 2004/0091445 A1 and 2004/0087476 A1; and U.S. Pat. Nos. 6,531,444; 6,024,943; 6,042,792; 6,051,540; 4,540,721 and 4,973,422.

Silicones are also examples of polymers that may be used as PDT, and can provide perfume benefits in a manner similar to the polymer-assisted delivery "matrix system". Such a PDT is referred to as silicone-assisted delivery (SAD). One may pre-load silicones with perfume, or use them as an equilibrium system as described for PAD. Suitable silicones as well as making same maybe found in WO 2005/102261; USPA 20050124530A1; USPA 20050143282A1; and WO 2003/015736. Functionalized silicones may also be used as described in USPA 2006/003913 A1. Examples of silicones include polydimethylsiloxane and polyalkyldimethylsiloxanes. Other examples include those with amine functionality, which may be used to provide benefits associated with amine-assisted delivery (AAD) and/or polymer-assisted delivery (PAD) and/or amine-reaction products (ARP). Other such examples may be found in U.S. Pat. No. 4,911,852; USPA 2004/0058845 A1; USPA 2004/0092425 A1 and USPA 2005/0003980 A1. b.) Reservoir Systems: Reservoir systems are also known as a core-shell type technology, or one in which the fragrance is surrounded by a perfume release controlling membrane, which may serve as a protective shell. The material inside the microcapsule is referred to as the core, internal phase, or fill, whereas the wall is sometimes called a shell, coating, or membrane. Microparticles or pressure sensitive capsules or microcapsules are examples of this technology. Microcapsules of the current invention are formed by a variety of procedures that include, but are not limited to, coating, extrusion, spray-drying, interfacial, in-situ and matrix polymerization. The possible shell materials vary widely in their stability toward water. Among the most stable are polyoxymethyleneurea (PMU)-based materials, which may hold certain PRMs for even long periods of time in aqueous solution (or product). Such systems include but are not limited to urea-formaldehyde and/or melamine-formaldehyde. Stable shell materials include polyacrylate-based materials obtained as reaction product of an oil soluble or dispersible amine with a multifunctional acrylate or methacrylate monomer or oligomer, an oil soluble acid and an initiator, in presence of an anionic emulsifier comprising a water soluble or water dispersible acrylic acid alkyl acid copolymer, an alkali or alkali salt. Gelatin-based microcapsules may be prepared so that they dissolve quickly or slowly in water, depending for example on the degree of cross-linking. Many other capsule wall materials are available and vary in the degree of perfume diffusion stability observed. Without wishing to be bound by theory, the rate of release of perfume from a capsule, for example, once deposited on a surface is typically in reverse order of in-product perfume diffusion stability. As such, urea-formaldehyde and melamine-formaldehyde microcapsules for example, typically require a release mechanism other than, or in addition to, diffusion for release, such as mechanical force (e.g., friction, pressure, shear stress) that serves to break the capsule and increase the rate of perfume (fragrance) release. Other triggers include melting, dissolution, hydrolysis or other chemical reaction, electromagnetic radiation, and the like. The use of pre-loaded microcapsules requires the proper ratio of in-product stability and in-use and/or on-surface (on-situs) release, as well as proper selection of PRMs. Microcapsules that are based on urea-formaldehyde and/or melamine-formaldehyde are relatively stable, especially in near neutral aqueous-based solutions. These materials may require a friction trigger which may not be applicable to all product applications. Other microcapsule materials (e.g., gelatin) may be unstable in aqueous-based products and may even provide reduced benefit (versus free perfume control) when in-product aged. Scratch and sniff technologies are yet another example of PAD. Perfume microcapsules (PMC) may include those described in the following references: US Patent Applications: 2003/0125222 A1; 2003/215417 A1; 2003/216488 A1; 2003/158344 A1; 2003/165692 A1; 2004/071742 A1; 2004/071746 A1; 2004/072719 A1; 2004/072720 A1; 2006/0039934 A1; 2003/203829 A1; 2003/195133 A1; 2004/087477 A1; 2004/0106536 A1; and U.S. Pat. Nos. 6,645,479 B1; 6,200,949 B1; U.S. Pat. Nos. 4,882,220; 4,917,920; 4,514,461; 6,106,875 and 4,234,627, 3,594,328 and US RE 32713, PCT Patent Application: WO 2009/134234 A1, WO 2006/127454 A2, WO 2010/079466 A2, WO 2010/079467 A2, WO 2010/079468 A2, WO 2010/084480 A2.

Molecule-Assisted Delivery (MAD): Non-polymer materials or molecules may also serve to improve the delivery of perfume. Without wishing to be bound by theory, perfume may non-covalently interact with organic materials, resulting in altered deposition and/or release. Nonlimiting examples of such organic materials include but are not limited to hydrophobic materials such as organic oils, waxes, mineral oils, petrolatum, fatty acids or esters, sugars, surfactants, liposomes and even other perfume raw material (perfume oils), as well as natural oils, including body and/or other soils. Perfume fixatives are yet another example. In one aspect, non-polymeric materials or molecules have a C Log P greater than about 2. Molecule-Assisted Delivery (MAD) may also include those described in U.S. Pat. Nos. 7,119,060 and 5,506,201. III. Fiber-Assisted Delivery (FAD): The choice or use of a situs itself may serve to improve the delivery of perfume. In fact, the situs itself may be a perfume delivery technology. For example, different fabric types such as cotton or polyester will have different properties with respect to ability to attract and/or retain and/or release perfume. The amount of perfume deposited on or in fibers may be altered by the choice of fiber, and also by the history or treatment of the fiber, as well as by any fiber coatings or treatments. Fibers may be woven and non-woven as well as natural or synthetic. Natural fibers include those produced by plants, animals, and geological processes, and include but are not limited to cellulose materials such as cotton, linen, hemp jute, flax, ramie, and sisal, and fibers used to manufacture paper and cloth. Fiber-Assisted Delivery may consist of the use of wood fiber, such as thermo-mechanical pulp and bleached or unbleached kraft or sulfite pulps. Animal fibers consist largely of particular proteins, such as silk, sinew, catgut and hair (including wool). Polymer fibers based on synthetic chemicals include but are not limited to polyamide nylon, PET or PBT polyester, phenol-formaldehyde (PF), polyvinyl alcohol fiber (PVOH), polyvinyl chloride fiber (PVC), polyolefins (PP and PE), and acrylic polymers. All such fibers may be pre-loaded with a perfume, and then added to a product that may or may not contain free perfume and/or one or more perfume delivery technologies. In one aspect, the fibers may be added to a product prior to being loaded with a perfume, and then loaded with a perfume by adding a perfume that may diffuse into the fiber, to the product. Without wishing to be bound by theory, the perfume may absorb onto or be adsorbed into the fiber, for example, during product storage, and then be released at one or more moments of truth or consumer touch points.

IV. Amine Assisted Delivery (AAD): The amine-assisted delivery technology approach utilizes materials that contain an amine group to increase perfume deposition or modify perfume release during product use. There is no requirement in this approach to pre-complex or pre-react the perfume raw material(s) and amine prior to addition to the product. In one aspect, amine-containing AAD materials suitable for use herein may be non-aromatic; for example, polyalkylimine, such as polyethyleneimine (PEI), or polyvinylamine (PVAm), or aromatic, for example, anthranilates. Such materials may also be polymeric or non-polymeric. In one aspect, such materials contain at least one primary amine. This technology will allow increased longevity and controlled release also of low ODT perfume notes (e.g., aldehydes, ketones, enones) via amine functionality, and delivery of other PRMs, without being bound by theory, via polymer-assisted delivery for polymeric amines. Without technology, volatile top notes can be lost too quickly, leaving a higher ratio of middle and base notes to top notes. The use of a polymeric amine allows higher levels of top notes and other PRMS to be used to obtain freshness longevity without causing neat product odor to be more intense than desired, or allows top notes and other PRMs to be used more efficiently. In one aspect, AAD systems are effective at delivering PRMs at pH greater than about neutral. Without wishing to be bound by theory, conditions in which more of the amines of the AAD system are deprotonated may result in an increased affinity of the deprotonated amines for PRMs such as aldehydes and ketones, including unsaturated ketones and enones such as damascone. In another aspect, polymeric amines are effective at delivering PRMs at pH less than about neutral. Without wishing to be bound by theory, conditions in which more of the amines of the AAD system are protonated may result in a decreased affinity of the protonated amines for PRMs such as aldehydes and ketones, and a strong affinity of the polymer framework for a broad range of PRMs. In such an aspect, polymer-assisted delivery may be delivering more of the perfume benefit; such systems are a subspecies of AAD and may be referred to as Amine-Polymer-Assisted Delivery or APAD. In some cases when the APAD is employed in a composition that has a pH of less than seven, such APAD systems may also be considered Polymer-Assisted Delivery (PAD). In yet another aspect, AAD and PAD systems may interact with other materials, such as anionic surfactants or polymers to form coacervate and/or coacervates-like systems. In another aspect, a material that contains a heteroatom other than nitrogen, for example sulfur, phosphorus or selenium, may be used as an alternative to amine compounds. In yet another aspect, the aforementioned alternative compounds can be used in combination with amine compounds. In yet another aspect, a single molecule may comprise an amine moiety and one or more of the alternative heteroatom moieties, for example, thiols, phosphines and selenols. Suitable AAD systems as well as methods of making same may be found in US Patent Applications 2005/0003980 A1; 2003/0199422 A1; 2003/0036489 A1; 2004/0220074 A1 and U.S. Pat. No. 6,103,678. V. Cyclodextrin Delivery System (CD): This technology approach uses a cyclic oligosaccharide or cyclodextrin to improve the delivery of perfume. Typically a perfume and cyclodextrin (CD) complex is formed. Such complexes may be preformed, formed in-situ, or formed on or in the situs. Without wishing to be bound by theory, loss of water may serve to shift the equilibrium toward the CD-Perfume complex, especially if other adjunct ingredients (e.g., surfactant) are not present at high concentration to compete with the perfume for the cyclodextrin cavity. A bloom benefit may be achieved if water exposure or an increase in moisture content occurs at a later time point. In addition, cyclodextrin allows the perfume formulator increased flexibility in selection of PRMs. Cyclodextrin may be pre-loaded with perfume or added separately from perfume to obtain the desired perfume stability, deposition or release benefit. Suitable CDs as well as methods of making same may be found in USPA 2005/0003980 A1 and 2006/0263313 A1 and U.S. Pat. Nos. 5,552,378; 3,812,011; 4,317,881; 4,418,144 and 4,378,923. VI. Starch Encapsulated Accord (SEA): The use of a starch encapsulated accord (SEA) technology allows one to modify the properties of the perfume, for example, by converting a liquid perfume into a solid by adding ingredients such as starch. The benefit includes increased perfume retention during product storage, especially under non-aqueous conditions. Upon exposure to moisture, a perfume bloom may be triggered. Benefits at other moments of truth may also be achieved because the starch allows the product formulator to select PRMs or PRM concentrations that normally cannot be used without the presence of SEA. Another technology example includes the use of other organic and inorganic materials, such as silica to convert perfume from liquid to solid. Suitable SEAs as well as methods of making same may be found in USPA 2005/0003980 A1 and U.S. Pat. No. 6,458,754 B1. VII. Inorganic Carrier Delivery System (ZIC): This technology relates to the use of porous zeolites or other inorganic materials to deliver perfumes. Perfume-loaded zeolite may be used with or without adjunct ingredients used for example to coat the perfume-loaded zeolite (PLZ) to change its perfume release properties during product storage or during use or from the dry situs. Suitable zeolite and inorganic carriers as well as methods of making same may be found in USPA 2005/0003980 A1 and U.S. Pat. Nos. 5,858,959; 6,245,732 B; 6,048,830 and 4,539,135. Silica is another form of ZIC. Another example of a suitable inorganic carrier includes inorganic tubules, where the perfume or other active material is contained within the lumen of the nano- or micro-tubules. In one aspect, the perfume-loaded inorganic tubule (or Perfume-Loaded Tubule or PLT) is a mineral nano- or micro-tubule, such as halloysite or mixtures of halloysite with other inorganic materials, including other clays. The PLT technology may also comprise additional ingredients on the inside and/or outside of the tubule for the purpose of improving in-product diffusion stability, deposition on the desired situs or for controlling the release rate of the loaded perfume. Monomeric and/or polymeric materials, including starch encapsulation, may be used to coat, plug, cap, or otherwise encapsulate the PLT. Suitable PLT systems as well as methods of making same may be found in U.S. Pat. No. 5,651,976. VII. Pro-Perfume (PP): This technology refers to perfume technologies that result from the reaction of perfume materials with other substrates or chemicals to form materials that have a covalent bond between one or more PRMs and one or more carriers. The PRM is converted into a new material called a pro-PRM (i.e., pro-perfume), which then may release the original PRM upon exposure to a trigger such as water or light. Pro-perfumes may provide enhanced perfume delivery properties such as increased perfume deposition, longevity, stability, retention, and the like. Pro-perfumes include those that are monomeric (non-polymeric) or polymeric, and may be pre-formed or may be formed in-situ under equilibrium conditions, such as those that may be present during in-product storage or on the wet or dry situs. Nonlimiting examples of pro-perfumes include Michael adducts (e.g., beta-amino ketones), aromatic or non-aromatic imines (Schiff bases), oxazolidines, beta-keto esters, and orthoesters. Another aspect includes compounds comprising one or more beta-oxy or beta-thio carbonyl moieties capable of releasing a PRM, for example, an alpha, beta-unsaturated ketone, aldehyde or carboxylic ester. The typical trigger for perfume release is exposure to water; although other triggers may include enzymes, heat, light, pH change, autoxidation, a shift of equilibrium, change in concentration or ionic strength and others. For aqueous-based products, light-triggered pro-perfumes are particularly suited. Such photo-pro-perfumes (PPPs) include but are not limited to those that release coumarin derivatives and perfumes and/or pro-perfumes upon being triggered. The released pro-perfume may release one or more PRMs by means of any of the above mentioned triggers. In one aspect, the photo-pro-perfume releases a nitrogen-based pro-perfume when exposed to a light and/or moisture trigger. In another aspect, the nitrogen-based pro-perfume, released from the photo-pro-perfume, releases one or more PRMs selected, for example, from aldehydes, ketones (including enones) and alcohols. In still another aspect, the PPP releases a dihydroxy coumarin derivative. The light-triggered pro-perfume may also be an ester that releases a coumarin derivative and a perfume alcohol. In one aspect the pro-perfume is a dimethoxybenzoin derivative as described in USPA 2006/0020459 A1. In another aspect the pro-perfume is a 3', 5'-dimethoxybenzoin (DMB) derivative that releases an alcohol upon exposure to electromagnetic radiation. In yet another aspect, the pro-perfume releases one or more low ODT PRMs, including tertiary alcohols such as linalool, tetrahydrolinalool, or dihydromyrcenol. Suitable pro-perfumes and methods of making same can be found in U.S. Pat. Nos. 7,018,978 B2; 6,987,084 B2; 6,956,013 B2; 6,861,402 B1; 6,544,945 B1; 6,093,691; 6,277,796 B1; 6,165,953; 6,316,397 B1; 6,437,150 B1; 6,479,682 B1; 6,096,918; 6,218,355 B1; U.S. Pat. Nos. 6,133,228; 6,147,037; 7,109,153 B2; 7,071,151 B2; 6,987,084 B2; 6,610,646 B2 and 5,958,870, as well as can be found in USPA 2005/0003980 A1 and USPA 2006/0223726 A1.a.) Amine Reaction Product (ARP): For purposes of the present application, ARP is a subclass or species of PP. One may also use "reactive" polymeric amines in which the amine functionality is pre-reacted with one or more PRMs to form an amine reaction product (ARP). Typically the reactive amines are primary and/or secondary amines, and may be part of a polymer or a monomer (non-polymer). Such ARPs may also be mixed with additional PRMs to provide benefits of polymer-assisted delivery and/or amine-assisted delivery. Nonlimiting examples of polymeric amines include polymers based on polyalkylimines, such as polyethyleneimine (PEI), or polyvinylamine (PVAm). Nonlimiting examples of monomeric (non-polymeric) amines include hydroxyl amines, such as 2-aminoethanol and its alkyl substituted derivatives, and aromatic amines such as anthranilates. The ARPs may be premixed with perfume or added separately in leave-on or rinse-off applications. In another aspect, a material that contains a heteroatom other than nitrogen, for example oxygen, sulfur, phosphorus or selenium, may be used as an alternative to amine compounds. In yet another aspect, the aforementioned alternative compounds can be used in combination with amine compounds. In yet another aspect, a single molecule may comprise an amine moiety and one or more of the alternative heteroatom moieties, for example, thiols, phosphines and selenols. The benefit may include improved delivery of perfume as well as controlled perfume release. Suitable ARPs as well as methods of making same can be found in USPA 2005/0003980 A1 and U.S. Pat. No. 6,413,920 B1.

In one aspect, the PRMs disclosed and stereoisomers thereof are suitable for use in perfume delivery systems at levels, based on total perfume delivery system weight, of from 0.001% to about 50%, from 0.005% to 30%, from 0.01% to about 10%, from 0.025% to about 5%, or even from 0.025% to about 1%.

In another aspect, the perfume delivery systems disclosed herein are suitable for use in consumer products, cleaning and treatment compositions, fabric and hard surface cleaning and/or treatment compositions, detergents, and highly compacted consumer products, including highly compacted fabric and hard surface cleaning and/or treatment compositions (e.g., solid or fluid highly compacted detergents) at levels, based on total consumer product weight, from 0.001% to 20%, from 0.01% to 10%, from 0.05% to 5%, from 0.1% to 0.5%.

In another aspect, the amount of PRMs present in the perfume delivery systems, based on the total microcapsule and/or nanocapsule (Polymer Assisted Delivery (PAD) Reservoir System) weight, may be from 0.1% to 99%, from 25% to 95%, from 30 to 90%, from 45% to 90%, or from 65% to 90%.

In one aspect, the amount of total perfume based on total weight of starch encapsulates and starch agglomerates (Starch Encapsulated Accord (SEA)) ranges from 0.1% to 99%, from 25% to 95%, from 30 to 90%, from 45% to 90%, from 65% to 90%. PRMs and stereoisomers may be used in combination in such starch encapsulates and starch agglomerates.

In another aspect, the amount of total perfume based on total weight of [cyclodextrin-perfume] complexes (Cyclodextrin (CD)) ranges from 0.1% to 99%, from 2.5% to 75%, from 5% to 60%, from 5% to 50%, from 5% to 25%. In one aspect, PRMs and stereoisomers are suitable for use in such [cyclodextrin-perfume] complexes. Such PRMs and stereoisomers thereof may be used in combination in such [cyclodextrin-perfume] complexes.

In another aspect, the amount of total perfume based on total weight of Polymer Assisted Delivery (PAD) Matrix Systems (including Silicones) ranges from 0.1% to 99%, from 2.5% to 75%, from 5% to 60%, from 5% to 50%, from 5% to 25%. In one aspect, the amount of total perfume based on total weight of a hot melt perfume delivery system/ perfume loaded plastic Matrix System and ranges from 1% to 99%, from 2.5% to 75%, from 5% to 60%, from 5% to 50%, from 10% to 50%. In one aspect, PRMs and stereoisomers are suitable for use in such Polymer Assisted Delivery (PAD) Matrix Systems, including hot melt perfume delivery system/perfume loaded plastic Matrix Systems. Such PRMs and stereoisomers thereof may be used in various combinations in such Polymer Assisted Delivery (PAD) Matrix Systems (including hot melt perfume delivery system/perfume loaded plastic Matrix Systems).

In one aspect, the amount of total perfume based on total weight of Amine Assisted Delivery (AAD) (including Aminosilicones) ranges from 1% to 99%, from 2.5% to 75%, from 5% to 60%, from 5% to 50%, from 5% to 25%. In one aspect, PRMs and stereoisomers are suitable for use in such Amine Assisted Delivery (AAD) systems. Such PRMs and stereoisomers thereof may be used in various combinations in such Amine Assisted Delivery (AAD) systems.

In one aspect, a Pro-Perfume (PP) Amine Reaction Product (ARP) system may comprise one or more nitriles. In one aspect, a Pro-Perfume (PP) Amine Reaction Product (ARP) system may comprise one or more ketones. In one aspect, a Pro-Perfume (PP) Amine Reaction Product (ARP) system may comprise one or more aldehydes. In one aspect, the amount of total perfume based on total weight of Pro-Perfume (PP) Amine Reaction Product (ARP) system ranges from 0.1% to 99%, from 1% to 99%, from 5% to 90%, from 10% to 75%, from 20% to 75%, from 25% to 60%.

Surfactant

In certain embodiments, the composition contains at least one surfactant. In certain embodiments, the amount of surfactant is 0.1 to 45% by weight. In other embodiments, the amount of surfactant is at least 0.1%, at least 1%, at least 5%, at least 10%, at least 15%, at least 20%, at least 25%, at least 30%, at least 35%, or at least 40% by weight. The surfactant can be any surfactant or any combination of surfactants. Examples of surfactants include anionic, nonionic, cationic, amphoteric, or zwitterionic. In certain embodiments, the surfactant comprises a nonionic surfactant, an amphoteric surfactant, or both.

Anionic surfactants include, but are not limited to, those surface-active or detergent compounds that contain an organic hydrophobic group containing generally 8 to 26 carbon atoms or generally 10 to 18 carbon atoms in their molecular structure and at least one water-solubilizing group selected from sulfonate, sulfate, and carboxylate so as to form a water-soluble detergent. Usually, the hydrophobic group will comprise a $C_8$-$C_{22}$ alkyl, or acyl group. Such surfactants are employed in the form of water-soluble salts and the salt-forming cation usually is selected from sodium, potassium, ammonium, magnesium and mono-, di- or tri-$C_2$-$C_3$ alkanolammonium, with the sodium, magnesium and ammonium cations again being the usual ones chosen.

The anionic surfactants that are used in the composition of this invention are water soluble and include, but are not limited to, the sodium, potassium, ammonium, and ethanolammonium salts of linear $C_8$-$C_{16}$ alkyl benzene sulfonates, alkyl ether carboxylates, $C_{10}$-$C_{20}$ paraffin sulfonates, $C_8$-$C_{25}$ alpha olefin sulfonates, $C_8$-$C_{18}$ alkyl sulfates, alkyl ether sulfates and mixtures thereof.

The paraffin sulfonates (also known as secondary alkane sulfonates) may be monosulfonates or di-sulfonates and usually are mixtures thereof, obtained by sulfonating paraffins of 10 to 20 carbon atoms. Commonly used paraffin sulfonates are those of C12-18 carbon atoms chains, and more commonly they are of C14-17 chains. Such compounds may be made to specifications and desirably the content of paraffin sulfonates outside the C14-17 range will be minor and will be minimized, as will be any contents of di- or poly-sulfonates. Examples of paraffin sulfonates include, but are not limited to HOSTAPUR™ SAS30, SAS 60, SAS 93 secondary alkane sulfonates from Clariant, and BIO-TERGE™ surfactants from Stepan, and CAS No. 68037-49-0.

Pareth sulfate surfactants can also be included in the composition. The pareth sulfate surfactant is a salt of an ethoxylated $C_{10}$-$C_{16}$ pareth sulfate surfactant having 1 to 30 moles of ethylene oxide. In some embodiments, the amount of ethylene oxide is 1 to 6 moles, and in other embodiments it is 2 to 3 moles, and in another embodiment it is 2 moles. In one embodiment, the pareth sulfate is a $C_{12}$-$C_{13}$ pareth sulfate with 2 moles of ethylene oxide. An example of a pareth sulfate surfactant is STEOL™ 23-2S/70 from Stepan, or (CAS No. 68585-34-2).

Examples of suitable other sulfonated anionic detergents are the well known higher alkyl mononuclear aromatic sulfonates, such as the higher alkylbenzene sulfonates containing 9 to 18 or preferably 9 to 16 carbon atoms in the higher alkyl group in a straight or branched chain, or $C_{8-15}$ alkyl toluene sulfonates. In one embodiment, the alkylbenzene sulfonate is a linear alkylbenzene sulfonate having a higher content of 3-phenyl (or higher) isomers and a correspondingly lower content (well below 50%) of 2-phenyl (or lower) isomers, such as those sulfonates wherein the benzene ring is attached mostly at the 3 or higher (for example 4, 5, 6 or 7) position of the alkyl group and the content of the isomers in which the benzene ring is attached in the 2 or 1 position is correspondingly low. Materials that can be used are found in U.S. Pat. No. 3,320,174, especially those in which the alkyls are of 10 to 13 carbon atoms.

Other suitable anionic surfactants are the olefin sulfonates, including long-chain alkene sulfonates, long-chain hydroxyalkane sulfonates or mixtures of alkene sulfonates and hydroxyalkane sulfonates. These olefin sulfonate detergents may be prepared in a known manner by the reaction of sulfur trioxide ($SO_3$) with long-chain olefins containing 8 to 25, preferably 12 to 21 carbon atoms and having the formula $RCH{=}CHR_1$ where R is a higher alkyl group of 6 to 23 carbons and $R_1$ is an alkyl group of 1 to 17 carbons or hydrogen to form a mixture of sultones and alkene sulfonic acids which is then treated to convert the sultones to sulfonates. In one embodiment, olefin sulfonates contain from 14 to 16 carbon atoms in the R alkyl group and are obtained by sulfonating an a-olefin.

Examples of satisfactory anionic sulfate surfactants are the alkyl sulfate salts and the and the alkyl ether polyethenoxy sulfate salts having the formula $R(OC_2H_4)_nOSO_3M$ wherein n is 1 to 12, or 1 to 5, and R is an alkyl group having about 8 to about 18 carbon atoms, or 12 to 15 and natural cuts, for example, $C_{12-14}$ or $C_{12-16}$ and M is a solubilizing cation selected from sodium, potassium, ammonium, magnesium and mono-, di- and triethanol ammonium ions. The alkyl sulfates may be obtained by sulfating the alcohols obtained by reducing glycerides of coconut oil or tallow or mixtures thereof and neutralizing the resultant product.

The ethoxylated alkyl ether sulfate may be made by sulfating the condensation product of ethylene oxide and $C_{8-18}$ alkanol, and neutralizing the resultant product. The ethoxylated alkyl ether sulfates differ from one another in the number of carbon atoms in the alcohols and in the number of moles of ethylene oxide reacted with one mole of such alcohol. In one embodiment, alkyl ether sulfates contain 12 to 15 carbon atoms in the alcohols and in the alkyl groups thereof, e.g., sodium myristyl (3 EO) sulfate.

Ethoxylated $C_{8-18}$ alkylphenyl ether sulfates containing from 2 to 6 moles of ethylene oxide in the molecule are also suitable for use in the invention compositions. These detergents can be prepared by reacting an alkyl phenol with 2 to 6 moles of ethylene oxide and sulfating and neutralizing the resultant ethoxylated alkylphenol.

Other suitable anionic detergents are the $C_9$-$C_5$ alkyl ether polyethenoxylcarboxylates having the structural formula $R(OC_2H_4)_nOX\ COOH$ wherein n is a number from 4 to 12, preferably 6 to 11 and X is selected from the group consisting of $CH_2$, $C(O)R_1$ and wherein $R_1$ is a $C_1$-$C_3$ alkylene group. Types of these compounds include, but are not limited to, $C_9$-$C_{11}$ alkyl ether polyethenoxy (7-9) C(O) $CH_2CH_2COOH$, $C_{13}$-$C_{15}$ alkyl ether polyethenoxy (7-9) and $C_{10}$-$C_{12}$ alkyl ether polyethenoxy (5-7) $CH_2COOH$. These compounds may be prepared by condensing ethylene oxide with appropriate alkanol and reacting this reaction product with chloracetic acid to make the ether carboxylic acids as shown in U.S. Pat. No. 3,741,911 or with succinic anhydride or phtalic anhydride.

The amine oxide is depicted by the formula: wherein $R_1$ is an alkyl, 2-hydroxyalkyl, 3-hydroxyalkyl, or 3-alkoxy-2-hydroxypropyl radical in which the alkyl and alkoxy, respectively, contain from about 8 to about 18 carbon atoms; $R_2$ and $R_3$ are each methyl, ethyl, propyl, isopropyl, 2-hydroxyethyl, 2-hydroxypropyl, or 3-hydroxypropyl; and n is from 0 to about 10. In one embodiment, the amine oxides are of the formula: wherein $R_1$ is a $C_{12-18}$ alkyl and $R_2$ and $R_3$ are methyl or ethyl. The above ethylene oxide condensates, amides, and amine oxides are more fully described in U.S. Pat. No. 4,316,824. In another embodiment, the amine oxide is depicted by the formula:

wherein $R_1$ is a saturated or unsaturated alkyl group having about 6 to about 24 carbon atoms, $R_2$ is a methyl group, and $R_3$ is a methyl or ethyl group. The preferred amine oxide is cocoamidopropyl-dimethylamine oxide.

The water soluble nonionic surfactants utilized in this invention are commercially well known and include the primary aliphatic alcohol ethoxylates, secondary aliphatic alcohol ethoxylates, alkylphenol ethoxylates and ethylene-oxide-propylene oxide condensates on primary alkanols, such a PLURAFAC™ surfactants (BASF) and condensates of ethylene oxide with sorbitan fatty acid esters such as the TWEEN™ surfactants (ICI). The nonionic synthetic organic detergents generally are the condensation products of an organic aliphatic or alkyl aromatic hydrophobic compound and hydrophilic ethylene oxide groups. Practically any hydrophobic compound having a carboxy, hydroxy, amido, or amino group with a free hydrogen attached to the nitrogen can be condensed with ethylene oxide or with the polyhydration product thereof, polyethylene glycol, to form a water-soluble nonionic detergent. Further, the length of the polyethenoxy chain can be adjusted to achieve the desired balance between the hydrophobic and hydrophilic elements.

The nonionic surfactant class includes the condensation products of a higher alcohol (e.g., an alkanol containing about 8 to 8 carbon atoms in a straight or branched chain configuration) condensed with about 5 to 30 moles of ethylene oxide, for example, lauryl or myristyl alcohol condensed with about 16 moles of ethylene oxide (EO), tridecanol condensed with about 6 to moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to about 14 carbon atoms in length and wherein the condensate contains either about 6 moles of EO per mole of total alcohol or about 9 moles of EO per mole of alcohol and tallow alcohol ethoxylates containing 6 EO to 11 EO per mole of alcohol.

In one embodiment, the nonionic surfactants are the NEODOL™ ethoxylates (Shell Co.), which are higher aliphatic, primary alcohol containing about 9-15 carbon atoms, such as $C_9$-$C_{11}$ alkanol condensed with 2.5 to 10 moles of ethylene oxide (NEODOL™ 91-2.5 OR -5 OR -6 OR -8), $C_{12-13}$ alkanol condensed with 6.5 moles ethylene oxide (NEODOL™ 23-6.5), $C_{12-15}$ alkanol condensed with 7 moles ethylene oxide (NEODOL™ 25-7), $C_{12-15}$ alkanol condensed with 12 moles ethylene oxide (NEODOL™ 25-12), $C_{14-15}$ alkanol condensed with 13 moles ethylene oxide (NEODOL™ 45-13), and the like.

Additional satisfactory water soluble alcohol ethylene oxide condensates are the condensation products of a secondary aliphatic alcohol containing 8 to 18 carbon atoms in a straight or branched chain configuration condensed with 5 to 30 moles of ethylene oxide. Examples of commercially available nonionic detergents of the foregoing type arc $C_{11}$-$C_{15}$ secondary alkanol condensed with either 9 EO (TERGITOL™ 15-S-9) or 12 EO (TERGTOL™ 15-S-12) marketed by Dow Chemical.

Other suitable nonionic surfactants include the polyethylene oxide condensates of one mole of alkyl phenol containing from about 8 to 18 carbon atoms in a straight- or branched chain alkyl group with about 5 to 30 moles of ethylene oxide. Specific examples of alkyl phenol ethoxylates include, but are not limited to, nonyl phenol condensed with about 9.5 moles of EO per mole of nonyl phenol, dinonyl phenol condensed with about 12 moles of EO per mole of phenol, dinonyl phenol condensed with about 15 moles of EO per mole of phenol and di-isoctylphenol condensed with about 15 moles of EO per mole of phenol. Commercially available nonionic surfactants of this type include IGEPAL™ CO-630 (nonyl phenol ethoxylate) marketed by GAF Corporation.

Also among the satisfactory nonionic surfactants are the water-soluble condensation products of a $C_8$-$C_{20}$ alkanol with a mixture of ethylene oxide and propylene oxide wherein the weight ratio of ethylene oxide to propylene oxide is from 2.5:1 to 4:1, preferably 2.8:1 to 3.3:1, with the total of the ethylene oxide and propylene oxide (including the terminal ethanol or propanol group) being from 60-85%, preferably 70-80%, by weight. Such detergents are commercially available from BASF and a particularly preferred detergent is a $C_{10}$-$C_{16}$ alkanol condensate with ethylene oxide and propylene oxide, the weight ratio of ethylene oxide to propylene oxide being 3:1 and the total alkoxy content being about 75% by weight.

Condensates of 2 to 30 moles of ethylene oxide with sorbitan mono- and tri-$C_{10}$-$C_{20}$ alkanoic acid esters having a HLB of 8 to 15 also may be employed as the nonionic detergent ingredient in the described composition. These surfactants are well known and are available from Imperial Chemical Industries under the TWEEN™ trade name. Suitable surfactants include, but are not limited to, polyoxyethylene (4) sorbitan monolaurate, polyoxyethylene (4) sorbitan monostearate, polyoxyethylene (20) sorbitan trioleate and polyoxyethylene (20) sorbitan tristearate.

Other suitable water-soluble nonionic surfactants are marketed under the trade name PLURONIC™. The compounds are formed by condensing ethylene oxide with a hydrophobic base formed by the condensation of propylene oxide with propylene glycol. The molecular weight of the hydrophobic portion of the molecule is of the order of 950 to 4000 and preferably 200 to 2,500. The addition of polyoxyethylene radicals to the hydrophobic portion tends to increase the solubility of the molecule as a whole so as to make the surfactant water-soluble. The molecular weight of the block polymers varies from 1,000 to 15,000 and the polyethylene oxide content may comprise 20% to 80% by weight. Preferably, these surfactants will be in liquid form and satisfactory surfactants are available as grades L 62 and L 64.

The alkyl polysaccharides surfactants, which can be used in the instant composition, have a hydrophobic group containing from about 8 to about 20 carbon atoms, preferably from about 10 to about 16 carbon atoms, or from about 12 to about 14 carbon atoms, and polysaccharide hydrophilic group containing from about 1.5 to about 10, or from about 1.5 to about 4, or from about 1.6 to about 2.7 saccharide units (e.g., galactoside, glucoside, fructoside, glucosyl, fructosyl; and/or galactosyl units). Mixtures of saccharide moieties may be used in the alkyl polysaccharide surfactants. The number x indicates the number of saccharide units in a particular alkyl polysaccharide surfactant. For a particular alkyl polysaccharide molecule x can only assume integral values. In any physical sample of alkyl polysaccharide surfactants there will be in general molecules having different x values. The physical sample can be characterized by the average value of x and this average value can assume non-integral values. In this specification the values of x are to be understood to be average values. The hydrophobic group (R) can be attached at the 2-, 3-, or 4-positions rather than at the 1-position, (thus giving e.g. a glucosyl or galactosyl as opposed to a glucoside or galactoside). However, attachment through the 1-position, i.e., glucosides, galactoside, fructosides, etc., is preferred. In one embodiment, the additional saccharide units are predominately attached to the previous saccharide unit's 2-position. Attachment through the 3-, 4-, and 6-positions can also occur. Optionally and less desirably there can be a polyalkoxide chain joining the hydrophobic moiety (R) and the polysaccharide chain. The preferred alkoxide moiety is ethoxide.

Typical hydrophobic groups include alkyl groups, either saturated or unsaturated, branched or unbranched containing from about 8 to about 20, preferably from about 10 to about 18 carbon atoms. In one embodiment, the alkyl group is a straight chain saturated alkyl group. The alkyl group can contain up to 3 hydroxy groups and/or the polyalkoxide chain can contain up to about 30, preferably less than about 10, alkoxide moieties.

Suitable alkyl polysaccharides include, but are not limited to, decyl, dodecyl, tetradecyl, pentadecyl, hexadecyl, and octadecyl, di-, tri-, tetra-, penta-, and hexaglucosides, galactosides, lactosides, fructosides, fructosyls, lactosyls, glucosyls and/or galactosyls and mixtures thereof.

The alkyl monosaccharides are relatively less soluble in water than the higher alkyl polysaccharides. When used in admixture with alkyl polysaccharides, the alkyl monosaccharides are solubilized to some extent. The use of alkyl monosaccharides in admixture with alkyl polysaccharides is a preferred mode of carrying out the invention. Suitable mixtures include coconut alkyl, di-, tri-, tetra-, and pentaglucosides and tallow alkyl tetra-, penta-, and hexaglucosides.

In one embodiment, the alkyl polysaccharides are alkyl polyglucosides having the formula $$R_2O(C_nH_{2n}O)_r(Z)_x$$

wherein Z is derived from glucose, R is a hydrophobic group selected from alkyl, alkylphenyl, hydroxyalkylphenyl, and mixtures thereof in which said alkyl groups contain from about 10 to about 18, preferably from about 12 to about 14 carbon atoms; n is 2 or 3, r is from 0 to 10; and x is from 1.5 to 8, or from 1.5 to 4, or from 1.6 to 2.7. To prepare these compounds a long chain alcohol ($R_2OH$) can be reacted with glucose, in the presence of an acid catalyst to form the desired glucoside. Alternatively the alkyl polyglucosides can be prepared by a two step procedure in which a short chain alcohol ($R_1OH$) can be reacted with glucose, in the presence of an acid catalyst to form the desired glucoside. Alternatively the alkyl polyglucosides can be prepared by a two step procedure in which a short chain alcohol ($C_{1-6}$) is reacted with glucose or a polyglucoside (x=2 to 4) to yield a short chain alkyl glucoside (x=1 to 4) which can in turn be reacted with a longer chain alcohol ($R_2OH$) to displace the short chain alcohol and obtain the desired alkyl polyglucoside. If this two step procedure is used, the short chain alkylglucoside content of the final alkyl polyglucoside material should be less than 50%, preferably less than 10%, more preferably less than about 5%, most preferably 0% of the alkyl polyglucoside.

The amount of unreacted alcohol (the free fatty alcohol content) in the desired alkyl polysaccharide surfactant is generally less than about 2%, or less than about 0.5% by weight of the total of the alkyl polysaccharide. For some uses it is desirable to have the alkyl monosaccharide content less than about 10%.

"Alkyl polysaccharide surfactant" is intended to represent both the glucose and galactose derived surfactants and the alkyl polysaccharide surfactants. Throughout this specification, "alkyl polyglucoside" is used to include alkyl polyglycosides because the stereochemistry of the saccharide moiety is changed during the preparation reaction.

In one embodiment, APG glycoside surfactant is APG 625 glycoside manufactured by the Henkel Corporation of Ambler, Pa. APG25 is a nonionic alkyl polyglycoside characterized by the formula:

$$C_nH_{2n+1}O(C_6H_{10}O_5)_xH$$

wherein n=10 (2%); n=122 (65%); n=14 (21-28%); n=16 (4-8%) and n=18 (0.5%) and x (degree of polymerization)=1.6. APG 625 has: a pH of 6 to 10 (10% of APG 625 in distilled water); a specific gravity at 25° C. of 1.1 g/ml; a density at 25° C. of 9.1 lbs/gallon; a calculated HLB of 12.1 and a Brookfield viscosity at 35° C., 21 spindle, 5-10 RPM of 3,000 to 7,000 cps.

The zwitterionic surfactant can be any zwitterionic surfactant. In one embodiment, the zwiderionic surfactant is a water soluble betaine having the general formula wherein $X^-$ is selected from $COO^-$ and $SO_3^-$ and $R_1$ is an alkyl group having 10 to about 20 carbon atoms, or 12 to 16 carbon atoms, or the amido radical:

wherein R is an alkyl group having about 9 to 19 carbon atoms and n is the integer 1 to 4; $R_2$ and $R_3$ are each alkyl groups having 1 to 3 carbons and preferably 1 carbon; $R_4$ is an alkylene or hydroxyalkylene group having from 1 to 4 carbon atoms and, optionally, one hydroxyl group. Typical alkyldimethyl betaines include, but are not limited to, decyl dimethyl betaine or 2-(N-decyl-N,N-dimethyl-ammonia)acetate, coco dimethyl betaine or 2-(N-coco N,N-dimethylammonia)acetate, myristyl dimethyl betaine, palmityl dimethyl betaine, lauryl dimethyl betaine, cetyl dimethyl betaine, stearyl dimethyl betaine, etc. The amidobetaines similarly include, but are not limited to, cocoamidoethylbetaine, cocoamidopropyl betaine and the like. The amidosulfobetaines include, but are not limited to, cocoamidoethylsulfobetaine, cocoamidopropyl sulfobetaine and the like. In one embodiment, the betaine is coco ($C_8$-$C_{18}$) amidopropyl dimethyl betaine. Three examples of betaine surfactants that can be used are EMPIGEN™ BS/CA from Albright and Wilson, REWOTERIC™ AMB 13 and Goldschmidt Betaine L7.

The composition can contain a solvent. Examples of solvent include, but are not limited to, water, alcohol, glycol, polyol, ethanol, propylene glycol, polyethylene glycol, glycerin, and sorbitol. As the amount of solvent increases in the composition, the association between ion pairings in the liquid salt or choline salt is reduced. In certain embodiments, the amount of solvent is at least 1%, at least 5%, at least 10%, at least 15%, at least 20%, at least 25%, at least 30%, at least 35%, at least 40%, at least 50%, at least 55%, at least 60%, at least 65%, at least 70%, at least 75%, or at least 80%, or at least 85%, at least 90%, or at least 95% by weight.

The composition can have any desired pH. In some embodiments, the composition is neutral to basic. The composition may have a pH of less than 10. The composition may have a pH between 6 to 10, such as, for example, a pH between 6 and 9 or a pH between 7 and 8.

Additional optional ingredients may be included to provide added effect or to make the product more attractive. Such ingredients include, but are not limited to, perfumes, fragrances, abrasive agents, disinfectants, radical scavengers, bleaches, chelating agents, antibacterial agents/preservatives, optical brighteners, hydrotropes, or combinations thereof.

The compositions can be formulated into light duty liquid dish detergents, hard surface cleaners, spray cleaners, floor cleaners, bucket dilutable cleaners, microwave cleaners, stove top cleaners, or any type of home care cleaner. The compositions can be used by applying the composition to a surface or a wash bath, such as dishwashing. Once applied, the composition can soak on the surface or an article can soak in the wash to increase the cleaning time of the composition. Because of the increased cleaning efficiency of the composition, less water can be used, which results in increased sustainability. The composition can result in less scrubbing needed for cleaning or elimination of the need for scrubbing. The compositions can be used to remove baked on food from substrates.

EXAMPLES

A. A cleaning composition comprising
a hydrogen bond donor,
a hydrogen bond acceptor, and
a surfactant,
wherein the hydroxy acid and hydrogen bond acceptor are present at a molar ratio of from about 5:1 to about 1.5:1.

B. The cleaning composition of paragraph A, wherein the hydrogen bond donor is a hydroxy acid.

C. The cleaning composition of paragraph B, wherein the hydroxy acid is selected from salicylic acid, glycolic acid, lactic acid, 5 octanoyl salicylic acid, levulinic acid, hydroxyoctanoic acid, hydroxycaprylic acid, lanolin fatty acids, and combinations thereof.

D. The cleaning composition of paragraph B, wherein the hydroxy acid is levulinic acid.

E. The cleaning composition of any of the preceding paragraphs, wherein the hydrogen bond acceptor is a quaternary ammonium salt selected from tallow trimethyl ammonium chloride; ditallow dimethyl ammonium chloride; ditallow dimethyl ammonium methyl sulfate; dihexadecyl dimethyl ammonium chloride; di(hydrogenated tallow) dimethyl ammonium chloride; dioctadecyl dimethyl ammonium chloride; dieicosyl dimethyl ammonium chloride; didocosyl dimethyl ammonium chloride; di(hydrogenated tallow) dimethyl ammonium methyl sulfate; choline chloride; dihexadecyl diethyl ammonium chloride; dihexadecyl dimethyl ammonium acetate; ditallow dipropyl ammonium phosphate; ditallow dimethyl ammonium nitrate; and di(coconut-alkyl) dimethyl ammonium chloride.

F. The cleaning composition of any of the preceding paragraphs, wherein the composition further comprises a perfume.

G. The cleaning composition of any of the preceding paragraphs, wherein the composition comprises between 0.1% to 45% by weight of the surfactant.

H. The cleaning composition of any of the preceding paragraphs, wherein the surfactant is selected from anionic surfactants, nonionic surfactants, cationic surfactants, amphoteric surfactants, zwitterioinic surfactants, or combinations thereof.

I. The cleaning composition of paragraph H, wherein the anionic surfactants are selected from sodium, potassium, ammonium, and ethanolammonium salts of linear $C_8$-$C_{16}$ alkyl benzene sulfonates, alkyl ether carboxylates, $C_{10}$-$C_{20}$ paraffin sulfonates, $C_5$-$C_{25}$ alpha olefin sulfonates, $C_8$-$C_{18}$ alkyl sulfates, alkyl ether sulfates and mixtures thereof.

J. The cleaning composition of paragraph H, wherein the nonionic surfactants are selected from condensation products of a higher alcohol condensed with about 5 to 30 moles of ethylene oxide, for example, lauryl or myristyl alcohol condensed with about 16 moles of ethylene oxide (EO), tridecanol condensed with about 6 to moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to about 14 carbon atoms in length and wherein the condensate contains either about 6 moles of EO per mole of total alcohol or about 9 moles of EO per mole of alcohol; higher aliphatic, primary alcohol containing about 9-15 carbon atoms, such as $C_9$-$C_{11}$ alkanol condensed with 2.5 to 10 moles of ethylene oxide (NEODOL™ 91-2.5 OR -5 OR -6 OR -8), $C_{12-13}$ alkanol condensed with 6.5 moles ethylene oxide (NEODOL™ 23-6.5), $C_{12-15}$ alkanol condensed with 7 moles ethylene oxide (NEODOL™ 25-7), $C_{14-15}$ alkanol condensed with 12 moles ethylene oxide (NEODOL™ 25-12), $C_1$.is alkanol condensed with 13 moles ethylene oxide (NEODOL™ 45-13), and the like; polyethylene oxide condensates of one mole of alkyl phenol containing from about 8 to 18 carbon atoms in a straight- or branched chain alkyl group with about 5 to 30 moles of ethylene oxide; water-soluble condensation products of a $C_8$-$C_{20}$ alkanol with a mixture of ethylene oxide and propylene oxide wherein the weight ratio of ethylene oxide to propylene oxide is from 2.5:1 to 4:1, preferably 2.8:1 to 3.3:1; condensing ethylene oxide with a hydrophobic base formed by the condensation of propylene oxide with propylene glycol; glucose and galactose derived surfactants and the alkyl polysaccharide surfactants; polysaccharide hydrophilic group containing from about 1.5 to about 10 saccharide units; and combinations thereof.

K. The cleaning composition of any of the preceding paragraphs, wherein the quaternary ammonium salt is choline chloride.

L. The cleaning composition of any of the preceding paragraphs, wherein the hydroxy acid to quaternary ammonium salt are present at a molar ratio of from about 3:1 to about 1.5:1.

M. The cleaning composition of any of the preceding paragraphs, wherein the hydrogen bond acceptor is an amino acid.

The invention is further described in the following examples. The examples are merely illustrative and do not in any way limit the scope of the invention as described and claimed.

TABLE 1

| Ingredient | Level | Purpose |
|---|---|---|
| Polysuga Mulse D9 | 2% | Cleaner |
| Ginger Lemongrass | 0.25% | Fragrance |
| Polysorbate 80 | 0.25% | Emulsifier |
| Alpha-Tocopherol | 0.01% | Stabilizer |
| L-arginine:levulinic acid (1:1) | 0.4% | Micro Preservation |
| Sodium Bicarbonate | 0.54% | pH Adjustment |
| Water | Balance | Diluent |

TABLE 2

| Ingredient | Level | Purpose |
|---|---|---|
| Polysuga mulse D9 | 0.5% | Cleaner |
| Teatime | 0.25% | Fragrance |
| Polysorbate 80 | 0.5% | Emulsifier |
| Alpha-Tocopherol | 0.01% | Stabilizer |
| 2:1 Levulinic acid:choline chloride | 15% | Cleaner |
| Water | Balance | Diluent |

As shown in FIG. 1, it has been surprisingly found that by utilizing a specific molar ratio of acid to choline chloride, one can create a solution that is translucent. For example, as shown in FIG. 1, at ratios of 5:1 to 1.5:1 (Samples 100, 102, 104, 106, and 108), one can achieve a translucent formulation. However, at ratios of 1:1 or less, the formulation becomes murky and/or is no longer translucent (Samples 110 and 112).

Figure 2:
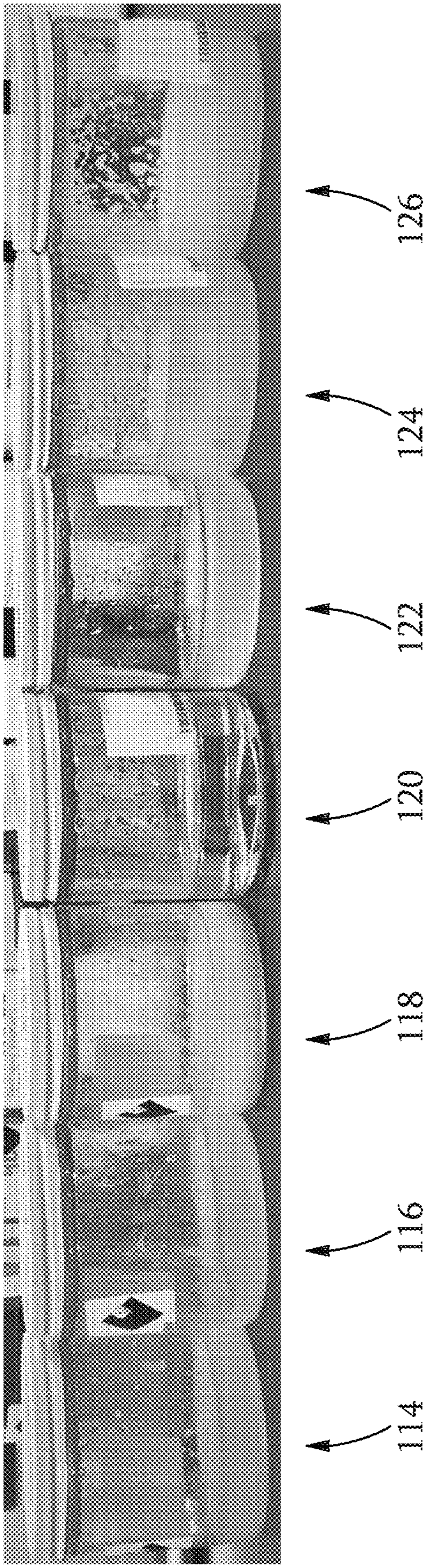
FIG. 2 is an image of multiple samples exemplifying an aspect of the invention.

Similarly, as shown in FIG. 2, the molar ratios may change depending on the acid source. For example, when using Urea, the ratio that creates a translucent formulation is between 3:1 (sample 118) and 1.5:1 (sample 122) or at about 2:1 (sample 120). Outside of that range in either direction creates a murky formulation (Samples 114, 116, 124, and 126).

Figure 3:
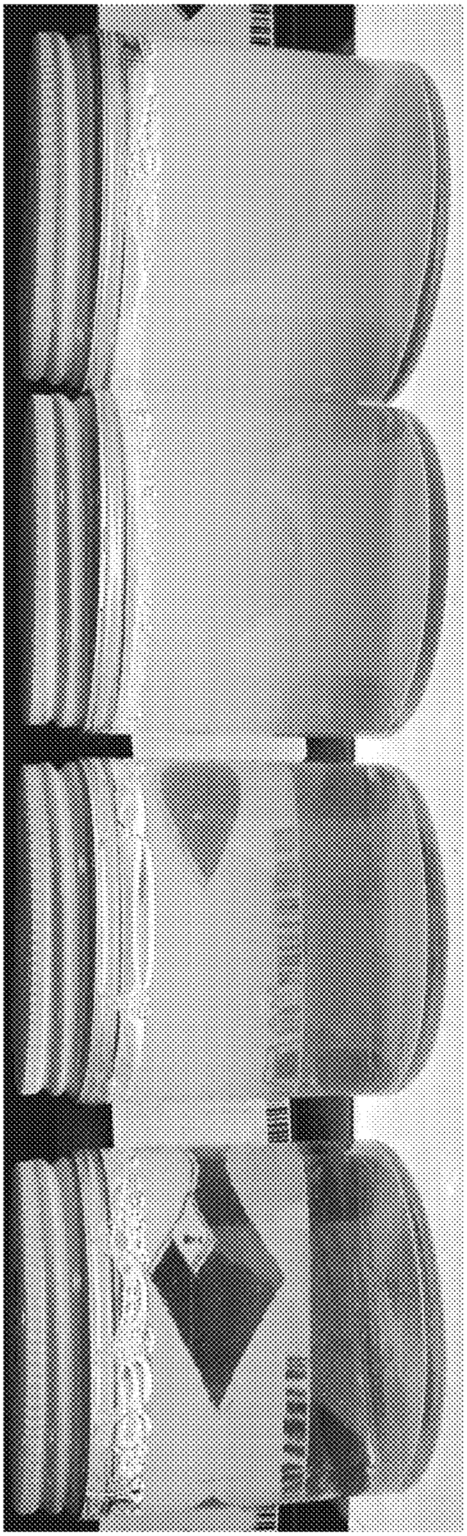
FIG. 3 is an image of multiple samples exemplifying an aspect of the invention.

As shown in FIG. 3, it has been further found that the use of the molar ratios described in FIGS. 1-2 may be utilized to increase the amount of essential oils that can be solubilized in the formulation while still creating a clear or translucent formulation. Specifically, as shown in FIG. 3, when solubilizing essential oils, if one utilizes levulinic acid only (sample 130), choline chloride only (sample 132), or combines levulinic acid and choline chloride with essential oils separately before combining them (sample 134), one achieves significantly less clear or translucent formulations than if one combines the levulinic acid and the choline chloride together before adding the essential oils.

Figure 4:
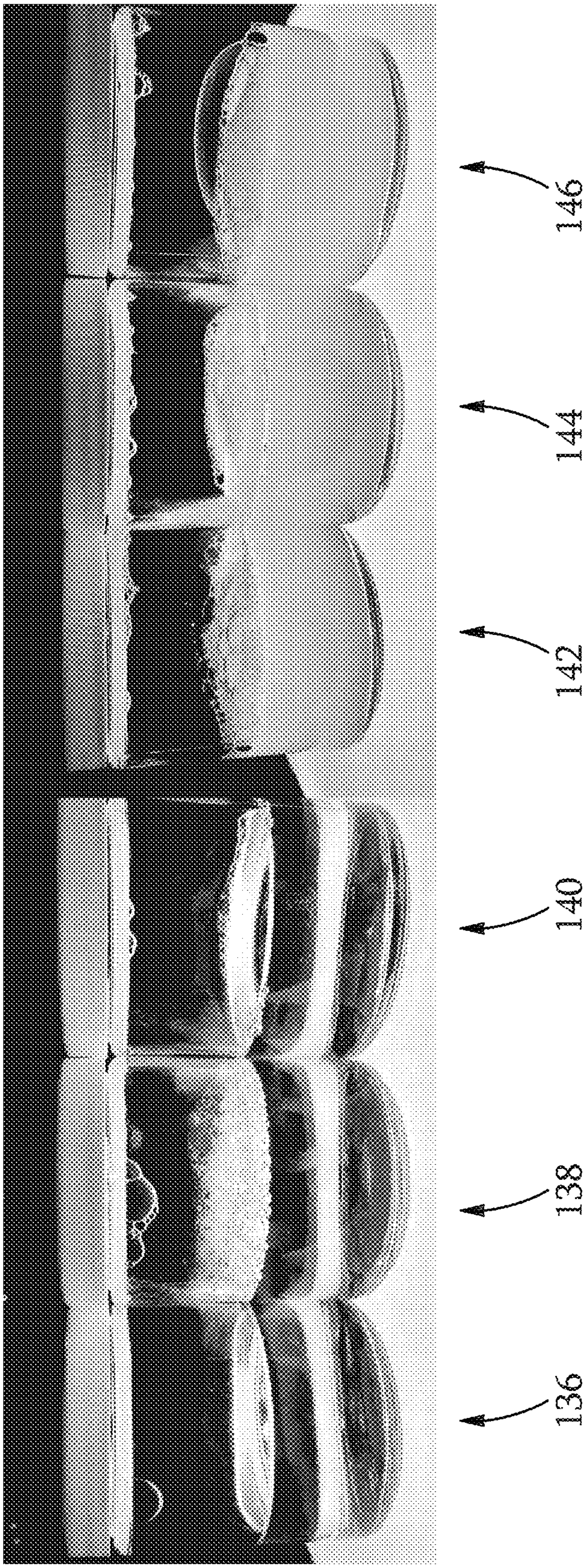
FIG. 4 is an image of multiple samples exemplifying an aspect of the invention.

It has further been surprisingly found that by manipulating the order of addition for the materials in the formulation, one can achieve significantly different results. Specifically, it has been found that one can create a translucent formulation with higher perfume levels by adding the perfume to the formulation after the choline chloride/acid blend is created and before adjusting the pH. As shown in FIG. 4, this order of manufacturing creates a translucent to clear formulation (samples 136, 138, and 140). Further, as shown in FIG. 4, by adding the perfume after the pH adjustment to the formulation, the resulting formulation becomes murky and is not translucent nor transparent (samples 142, 144, and 146). Without being bound by theory, it is believed that by adding the perfume before the pH adjustment, the perfume is allowed to be solubilized by the choline chloride/acid mixture. Once the pH is adjusted, the perfume can no longer be solubilized due to the more basic nature of the formulation.

Figure 5:
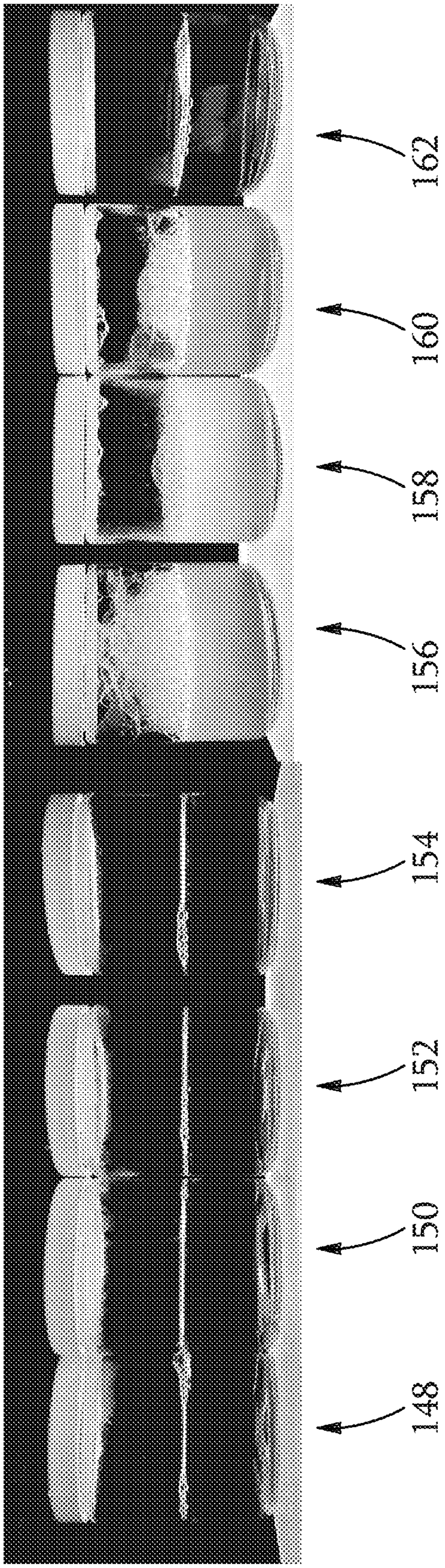
FIG. 5 is an image of multiple samples exemplifying an aspect of the invention.

This is further exemplified in FIG. 5, wherein post pH adjustment formulation create a transparent or clear formulation at molar ratios of 2:1 molar ratio of levulinic acid: choline chloride (sample 154), 3:1:5 weight ratio of succinic:adipic:glutaric (sample 152), 1:8:1 weight ratio of succinic:acipic:glutaric (sample 150), and 1:1:5 weight ratio of succinic:adipic:glutaric (sample 148). In comparison, for the same formulations, if the perfume is added after the pH adjustment, with no other changes to the composition or the method of manufacturing, with the exception of the levulinic acid:choline choride formulation (sample 162), one ends up with a murky and/or non-clear formulation (samples 156, 158, and 160).

The examples of FIGS. 4 and 5 are further exemplified by the data below in table 3: Absorbance data @ 600 nm for fresh and aged solutions

| Sample | Solution ID | Abs @ 600 nm, fresh | Abs @ 600 nm, aged |
|---|---|---|---|
| 142 | 1:1:5 succ:adip:glut/2% choline chloride | 53.7 | 53.2 |
| 156 | 1:1:5 succ:adip:glut/1% choline chloride | 5.9 | 5.9 |
| 144 | 1:8:1 succ:adip:glut/2% choline chloride | 0.2 | 0.2 |
| 158 | 1:8:1 succ:adip:glut/1% choline chloride | 0.2 | 0.2 |
| 146 | 3:1:5 succ:adip:glut/2% choline chloride | 6.4 | 6.3 |
| 160 | 3:1:5 succ:adip:glut/2% choline chloride | 30.3 | 30.1 |
| 162 | 1:2 levulinic acid:choline chloride | 89.6 | 88.9 |

As shown in Table 3, For both the 1% and 2% choline chloride formulations with 5% of each of the acid blends produced clear solution after pH adjustment and prior to the perfume addition. The addition of the natural perfume to both the 1% and 2% choline chloride solutions with 5% each of the acid blends resulted in turbid, unstable solutions. Specifically, as shown in the table, by adding the perfume to the formulation after the choline chloride/acid blend is created and before adjusting the pH, one can create a composition that exhibits absorbance at 600 nanometers of greater than 60% or between 60% and 90%, for both fresh and aged compositions, such as, for example, greater than 70%, greater than 80%, greater than 85% for both fresh and aged compositions.

Turbidity measurements for the solutions measured initially and after 3 wks of stability @25° C., exhibited absorbances below 55% that were consistent with aging. Turbidity measurements for the 1:2 levulinic acid:choline chloride solution measured initially and after 3 wks of stability @ 25° C. exhibited absorbances above 85% that were consistent with aging.

Additionally, without being bound by theory, it is believed that the increased solubility of the perfume allows for better retention of the perfume within the composition. Specifically, it is believed that by solubilizing the perfume with the eutectic liquid, one can retain the top and medium notes thereby allowing them to bloom and deliver the targeted scent at the point of use.

This is in contrast to a formulation that does not retain the perfume within the eutectic liquid that allows the perfume and the top and medium notes within the perfume to diffuse to the atmosphere over time thereby delivering a perfume that is not equivalent to the original perfume added to the composition.

This can be shown using a diffusion test wherein the formulations are measured for weight at an initial timepoint and then measured after being held at a fixed temperature for a fixed amount of time. By comparing the two weights, one can determine the amount of perfume that has diffused from the product. Without being bound by theory, and recognizing that increased temperatures will lead to higher diffusion, it is believed that between 1% to 50% of the perfume can diffuse within one month at temperatures between 25 C and 40 C.

The formulations above can be applied as low viscosity aerosol spray or pump spray products. Alternatively, they can be modified as needed with salts, surfactants, polymers or other thickening agents to produce moderately to highly viscous liquids, rinsing gels or gelled liquids that can be poured or wiped onto a soiled surface. The treatment can be used on baking dishes, conventional or microwave oven surfaces, cooking surfaces or other cooking device that has stuck on food residue. They are well suited for removing protein, carbohydrate and grease derived stains from other hard surfaces such as kitchen floors, bathroom tubs/shower stalls, sinks and toilet bowls. Consumers desire low foaming products which require minimal rinsing for these tasks. These formulas contain choline chloride and additionally contain a mixture of one or more co-solvents for enhanced performance.

Test Methods:

Turbidity Analysis Essential Oil Solubilization:

The turbidity analysis essential oil solubilization test is based spectrometric analysis. The data may be collected for fresh product and for product aged 3 wks @ 25° C. The turbidity measurements may be performed on a scanning double-beam spectrometer, with both deuterium and halogen lamps, such as a Perkin Elmer Lambda 35 UVNis spectrometer, or equivalent, in a 1.0 cm pathlength cell. Spectral measurements should be obtained via a 400-700 nm absorbance scan verse an air blank. Gently decant the sample into the sample cell, minimizing mixing. The maximum absorbance is recorded for all samples at 600 nm. Samples with an absorbance ≥85% @ 600 nm indicate a stable microemulsion of natural perfume. Samples with an absorbance ≤85% indicate an unstable microemulsion of natural perfume.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning composition comprising
a hydrogen bond donor comprising levulinic acid,
an essential oil,
choline chloride,
a keto acid, and
a surfactant,
wherein the hydrogen bond donor and choline chloride are present at a molar ratio of from about 5:1 to about 1.5:1 and the cleaning composition is a stable microemulsion and has an absorbance ≥85% @ 600 nm.

2. The cleaning composition of claim 1, wherein the hydrogen bond donor further comprises salicylic acid, glycolic acid, lactic acid, 5 octanoyl salicylic acid, hydroxyoctanoic acid, hydroxycaprylic acid, lanolin fatty acids, or combinations thereof.

3. The cleaning composition of claim 1, wherein choline chloride is present at about 7.5% to about 90% by weight of the composition.

4. The cleaning composition of claim 1, wherein the composition further comprises a perfume.

5. The cleaning composition of claim 1, wherein the composition comprises between 0.1% to 45% by weight of the surfactant.

6. The cleaning composition of claim 1, wherein the surfactant is selected from anionic surfactants, nonionic surfactants, cationic surfactants, amphoteric surfactants, zwitterioinic surfactants, or combinations thereof.

7. The cleaning composition of claim 6, wherein the anionic surfactants are selected from sodium, potassium, ammonium, and ethanolammonium salts of linear $C_8$-$C_{16}$ alkyl benzene sulfonates, alkyl ether carboxylates, $C_{10}$-$C_{20}$ paraffin sulfonates, $C_8$-$C_{25}$ alpha olefin sulfonates, $C_8$-$C_{18}$ alkyl sulfates, alkyl ether sulfates or mixtures thereof.

8. The cleaning composition of claim 1, wherein the hydrogen bond donor is present at about 1% to about 75% by weight of the composition.

9. A cleaning composition comprising levulinic acid, choline chloride, a dicarboxylic acid, a keto acid, and a quaternary ammonium salt, wherein the levulinic acid and choline chloride are present at a molar ratio of from about 5:1 to about 1.5:1, wherein the cleaning composition has an absorbance ≥85% @ 600 nm.

10. The cleaning composition of claim 9, wherein the keto acid comprises pyruvic acid.

* * * * *